US009710140B2

(12) United States Patent
Moreau et al.

(10) Patent No.: US 9,710,140 B2
(45) Date of Patent: Jul. 18, 2017

(54) OPTIMIZING LAYOUT OF INTERACTIVE ELECTRONIC CONTENT BASED ON CONTENT TYPE AND SUBJECT MATTER

(71) Applicant: Adobe Systems Incorporated, San Jose, CA (US)

(72) Inventors: Stéphane Moreau, L'Hay les Roses (FR); Anmol Dhawan, Ghaziabad UP (IN); Ashish Duggal, Delhi (IN); Sachin Soni, New Delhi (IN)

(73) Assignee: Adobe Systems Incorporated, San Jose, CA (US)

( * ) Notice: Subject to any disclaimer, the term of this patent is extended or adjusted under 35 U.S.C. 154(b) by 282 days.

(21) Appl. No.: 14/660,107

(22) Filed: Mar. 17, 2015

(65) Prior Publication Data

US 2016/0274764 A1   Sep. 22, 2016

(51) Int. Cl.
  *G06F 3/00* (2006.01)
  *G06F 3/0484* (2013.01)
  *H04L 29/08* (2006.01)
  *G06F 17/21* (2006.01)
  *H04L 29/06* (2006.01)
  *G06F 3/01* (2006.01)

(52) U.S. Cl.
  CPC ...... *G06F 3/04842* (2013.01); *G06F 3/04847* (2013.01); *G06F 17/212* (2013.01); *H04L 67/02* (2013.01); *H04L 67/04* (2013.01); *H04L 67/10* (2013.01); *H04L 67/125* (2013.01); *H04L 67/306* (2013.01); *H04L 67/42* (2013.01)

(58) Field of Classification Search
  None
  See application file for complete search history.

(56) References Cited

U.S. PATENT DOCUMENTS

| 5,848,397 | A | 12/1998 | Marsh et al. |
| 2006/0026067 | A1 | 2/2006 | Nicholas et al. |
| 2007/0130004 | A1 | 6/2007 | Borgs et al. |
| 2007/0192121 | A1 | 8/2007 | Routson |
| 2008/0307066 | A1 | 12/2008 | Amidon et al. |
| 2010/0088177 | A1 | 4/2010 | Lu |
| 2010/0162118 | A1* | 6/2010 | Kim .................... H04L 12/2809 715/716 |

(Continued)

*Primary Examiner* — Toan Vu
(74) *Attorney, Agent, or Firm* — Kilpatrick Townsend & Stockton LLP

(57) ABSTRACT

Certain embodiments involve optimizing how interactive content is arranged in electronic communications. A processor identifies a subject matter type associated with first and second online content items having respective first and second presentation types. The processor determines that a client has previously interacted more extensively with online content having the subject matter type and the first presentation type as compared to other online content having the subject matter type and the second presentation type. The processor selects a layout for an electronic communication for accessing the online content items based on determining that the client interacted more extensively with online content having the first presentation type. The layout displays a first portion for accessing the first online content item more prominently than a second portion for accessing the second online content item. The processor presents the layout via an interface for editing the electronic communication.

17 Claims, 6 Drawing Sheets

(56) References Cited

U.S. PATENT DOCUMENTS

| | | |
|---|---|---|
| 2013/0268508 A1 | 10/2013 | Bracher |
| 2015/0235672 A1* | 8/2015 | Cudak ................ G11B 27/3081 |
| | | 386/241 |
| 2016/0034159 A1* | 2/2016 | Vranjes ............... G06F 3/04847 |
| | | 715/800 |
| 2016/0062635 A1* | 3/2016 | Feit .................... G06F 3/04883 |
| | | 715/765 |
| 2016/0179454 A1* | 6/2016 | Liu ..................... G06F 3/04842 |
| | | 715/747 |

* cited by examiner

OPTIMIZING LAYOUT OF INTERACTIVE ELECTRONIC CONTENT BASED ON CONTENT TYPE AND SUBJECT MATTER

TECHNICAL FIELD

This disclosure relates generally to computer-implemented methods and systems and more particularly relates to optimizing the layout of interactive electronic content used to access online content.

BACKGROUND

Electronic communications, such as e-mails and web pages, can be used by vendors and other businesses to induce customers and other users to access online content. For example, e-mails may be sent to users that have links to online video content, image content, or text content that describes different products or services. A user may click one or more links in an e-mail to access this online content via a website that is affiliated with a sender of the e-mail.

Current solutions for generating these electronic communications may present disadvantages. For example, an e-mail or other electronic communication may include multiple links (e.g., uniform resource locators) to different types of online content (e.g., videos, text articles, etc.). These links may be positioned in the electronic communication without regard to which type of content may be more appealing to the user. For example, although a user may be more interested in a video about sports than a text article about sports, a link to the video may be positioned at the bottom of the e-mail or may be associated with a smaller clickable portion of the e-mail. The reduced prominence of the video link may cause the user to overlook the video link. Thus, for at least some users, the e-mail may be unsuccessful at causing a user to access related online content, even if the user might be interested in doing so.

It is desirable to optimize the layout of interactive electronic content, such as the links presented in electronic messages, using the type and subject matter of online content that is accessible via the interactive electronic content.

SUMMARY

According to certain embodiments, systems and methods are provided for optimizing the layout of interactive electronic content used to access online content based on the online content's presentation type and subject matter. In accordance with some embodiments, a processor (e.g., in a server or other computing device) optimizes the layout of interactive electronic content items in e-mails, multimedia messages, or other electronic communications. For example, when generating or modifying an electronic communication, a processor identifies a subject matter type (e.g., sports, news, etc.) associated with first and second online content items that have respective first and second presentation types (e.g., text articles, video presentations, image slideshows, etc.) and that will be accessible via the electronic communication. The processor determines that a client has previously interacted more extensively with online content having the subject matter type and the first presentation type (e.g., video presentations about sports) as compared to other online content having the subject matter type and the second presentation type (e.g., text articles about sports). The processor selects a layout for the electronic communication based on determining that the client interacted more extensively with online content having the first presentation type. The layout displays a first portion (e.g., a clickable link) for accessing the first online content item more prominently than a second portion for accessing the second online content item. For example, the first portion may be larger, may be positioned near the top edge of the electronic communication, or may be otherwise positioned to attract the attention of a user. The processor presents the layout via an interface for editing the electronic communication. For example, the interface can be used to add content items (e.g., images, text messages, etc.) to clickable portions of the layout that are associated with links to online content.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings, where.

DETAILED DESCRIPTION

Figure 1:
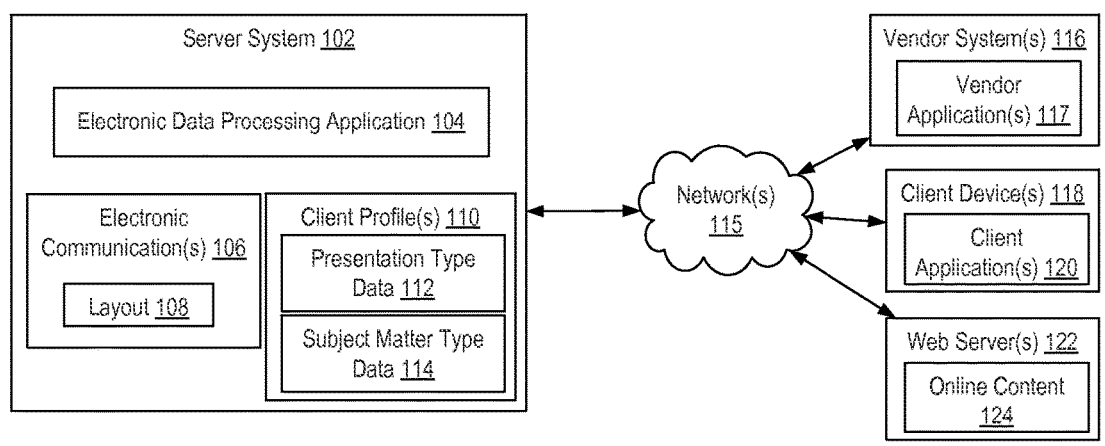
FIG. 1 is a block diagram depicting an example of a system including a server that executes an electronic data processing application for adaptively arranging interactive content in electronic communications according to certain exemplary embodiments.

Improved systems and techniques are disclosed for arranging interactive content in an electronic communication in a manner that maximizes or otherwise increases the likelihood of a user interacting with online content that may be accessed using the electronic communication. In some embodiments, an electronic message with links to different types of online content is generated using a layout that is selected based on certain content types (e.g., videos, slideshows, text articles) being more effective for soliciting user interactions for certain types of subject matter (e.g., sports, news, technology). For example, an electronic message may include links to different types of online content associated with a given type of subject matter. A first link to a first type of electronic content may be displayed more prominently based on a user being more likely to interact with that content type, and a second link to a second type of electronic content may be displayed less prominently based on a user being less likely to interact with that content type. For example, if a user is more likely to access a video depicting a sporting event than a text article describing the sporting event, a larger clickable element having a link to the video may be positioned toward the top of the message, and a smaller clickable element having a link to the article may be positioned toward the top of the message. This optimized layout of interactive content within the electronic message can increase online traffic to a content provider by arranging links in an e-mail or other message in a way that is more likely to cause a user to access online content via one or more of the links.

The following example is provided to help introduce the general subject matter of certain embodiments. A data processing application can determine that certain users or certain classes of users (e.g., users in certain demographics or geographic locations) are more likely to access videos for subjects such as sports and are more likely to access text articles for subjects such as technology. The determination is performed based on an analysis of historical interactions with online content that is accessible via e-mails or other electronic messages. When preparing a new message that provides users with access to content on a specific topic (e.g., sports), the data processing application uses this analysis to determine which types of content (e.g., videos, slideshows, text articles) are more likely to result in higher amounts of user interaction. The data processing application selects, generates, or otherwise obtains a layout for the message in which links to the most effective type of content for that topic are displayed more prominently as compared to links to the less effective type of content for that topic. The data processing application generates the electronic message using the layout, and the data processing application or another suitable application transmits the message to one or more users.

In accordance with some embodiments, a server system or other processing system uses electronic communications transmitted to one or more clients to determine the extent to which one or more clients interact with electronic content having certain presentation types and subject matter types. For example, each of the electronic communications (e.g., e-mails, multimedia messaging service messages, webpages) may include multiple links to different sets of online content having the same subject matter type (e.g., sports, fashion, etc.) and different presentation types (e.g., text, video, audio, etc.). The server or other processing system determines that one or more clients have interacted more extensively with a first set of online content having a given subject matter type and a given presentation type as compared to a second set of online content having the same subject matter type and a different presentation type. The server or other processing system also determines that a new electronic communication to be transmitted to the user will include links to additional sets of online content having the subject matter type.

The server or other processing system automatically selects a layout for the new electronic communication based on the extent to which one or more clients have interacted with similar online content (e.g., online content of the same subject matter type) having one or more presentation types. For example, for a given subject matter type (e.g., sports) and a given set of one or more clients, the layout may display a first link to online content with a first presentation type (e.g. text articles) more prominently than a second link to online content with a second presentation type (e.g. videos). The server or other processing system presents or otherwise provides access to the selected layout via a graphical interface (e.g., an interface in an application for developing marketing campaigns). The additional electronic communication can be generated or otherwise modified using both the selected layout and inputs received via the graphical interface (e.g., inputs adding interactive content items to portions associated with links to online content).

As used herein, the term "client" refers to a logically identifiable entity to which electronic communications can be addressed for transmission via a data network. In some embodiments, a client entity is associated with data that is accessible via a single device. For example, a client may be a specific computing device, such as a smart phone identified by a particular phone number. In other embodiments, a client entity is associated with data that is accessible via multiple devices. For example, a client may be a logical identifier, such as an e-mail address, that can be used to access data from one or more computing devices (e.g., a smart phone, a laptop computer, etc.).

As used herein, the term "subject matter type" refers to a genre, category, or other description of the content included in electronic data, regardless of the manner in which the electronic data is presented to a user. Examples of subject matter types include sports, automotive, education, food, health, real estate, etc.

As used herein, the term "presentation type" refers to a manner in which electronic data is displayed or otherwise presented to a user. Examples of presentation types include text, video, audio, etc. In some embodiments, electronic content may include multiple presentation types (e.g., a webpage having a text article and an embedded video).

As used herein, the term "online content" refers to electronic content that is accessible by a computing device via the Internet and/or one or more other data networks. In some embodiments, online content includes one or more websites or webpages hosted by one or more web servers.

The extent to which a client has interacted with online content can be determined in any suitable manner. In some embodiments, the extent to which a client has interacted with online content is determined based on whether the client clicked a link to the online content or otherwise accessed the online content. In additional or alternative embodiments, the extent to which a client has interacted with online content is determined based on whether the client accessed the online content more frequently than other online content. In additional or alternative embodiments, the extent to which a client has interacted with online content is determined based on whether the client accessed the online content prior to accessing other online content. In additional or alternative embodiments, the extent to which a client has interacted with online content is determined based on whether the client accessed a larger amount of the online content than other online content. In additional or alternative embodiments, the extent to which a client has interacted with online content is determined based on whether the client navigated through a larger amount of the online content than other online content (e.g., by scrolling through an article, zooming on an image, rewinding or fast-forwarding a video, etc.).

The prominence of a link in a layout can be associated with the likelihood of a user noticing the link more quickly than one or more other links. In some embodiments, displaying a link closer to an edge of a layout (e.g., the top or left) can indicate that the link is more prominent than other links in the middle of the layout. In additional or alternative embodiments, a link may be displayed more prominently than one or more other links by associating the link with a clickable region of the layout that is larger than other clickable regions associated with other links. In additional or alternative embodiments, a link may be displayed more prominently than one or more other links by associating the link with a layer of a multi-layer layout that has a greater visibility (e.g., a "top" or "front" layer) than other layers associated with other links.

Referring now to the drawings, FIG. 1 is a block diagram depicting an example of a system including a server system 102 that executes an electronic data processing application 104 for adaptively arranging content in electronic communications 106. The electronic data processing application 104 can be used to generate, modify, select, or otherwise use one or more layouts 108 for any type of electronic communication 106 (e.g., e-mails, multimedia messages that can be delivered to smart phones, push notification dialogs, webpages, etc.).

The server system 102 can communicate with one or more vendor systems 116 and one or more client devices 118 via one or more of signals communicated via one or more data networks 115. The server system 102 can include one or more processing devices. In some embodiments, the server system 102 can be a single server. In other embodiments, the server system 102 can include multiple computing systems that are configured for distributed computer (e.g., grid-based computing, cloud computing, etc.).

The server system 102 can include or have access to one or more non-transitory computer-readable media on which program code and electronic data are stored. The program code includes an electronic data processing application 104. The electronic data includes one or more electronic communications 106 associated with one or more layouts 108 and one or more client profiles having presentation type data 112 and subject matter type data 114.

The electronic data processing application 104 is executable by a processing device to perform one or more operations for generating or modifying customized electronic communications 106 using the presentation type data 112 and the subject matter type data 114 included in one or more client profiles 110. An electronic communication 106 can include electronic data having interactive content, such as clickable images or other clickable content, that is arranged according to one or more layouts 108. The interactive content is used by clients to access online content 124 hosted on a web server 122 or other server. Various details regarding the generation of customized electronic communications 106 are provided herein with respect to FIGS. 2-6.

A vendor system 116 can include any computing device or group of computing devices that can access the electronic data processing application 104 to generate, modify, or otherwise use one or more electronic communications 106. In some embodiments, a vendor system 116 transmits one or more of the electronic communications 106 to the server system 102 (e.g., via e-mail, via an upload interface presented in a web browser executed at a vendor system 116, etc.). In additional or alternative embodiments, a vendor system 116 remotely accesses the electronic data processing application 104 and uses the electronic data processing application 104 to generate one or more of the electronic communications 106 (e.g., via a design interface or a data entry interface presented in a web browser executed at a vendor system 116).

The vendor system 116 depicted in FIG. 1 includes one or more processing devices for executing one or more vendor applications 117. A vendor application 117 includes program code that can be executed at the vendor system 116 for transmitting, creating, editing, modifying, or otherwise using one or more electronic communications 106. For example, a vendor application 117 may be used to generate and send online messages that are associated with a marketing campaign. In some embodiments, a vendor application 117 can be a dedicated application installed on a non-transitory computer-readable medium that is included in or accessible to a vendor system 116. In additional or alternative embodiments, a vendor application 117 can be a web browser application or other suitable application that is installed on a non-transitory computer-readable medium accessible to a vendor system 116 and that can be used to remotely access one or more features of the electronic data processing application 104.

The client device 118 depicted in FIG. 1 can be any computing device that accesses one or more other computing systems via the data network 115. Non-limiting examples of client devices 118 include smart phones, tablet computers, laptop computers, etc. Each client device 118 executes one or more client applications 120. A client application 120 is any application suitable for receiving and interacting with electronic communications 106 to which the server system 102 provides access. Non-limiting examples of client applications 120 include web browser applications, e-mail applications, etc.

The web server 122 depicted in FIG. 1 can be any server, computing device, or combination of computing devices that provides access to online content 124 (e.g., webpages) that is accessible via the Internet and/or one or more other data networks 115. Online content 124 may include a web site for purchasing products or services that are described or depicted in electronic communications 106. The electronic communications 106 include links to the online content 124 hosted by one or more web servers 122.

For illustrative purposes, the server system 102, the vendor system 116, and the web server 122 are depicted as separate systems. However, other implementations are possible. For example, a server system 102 may perform one or more of executing the electronic data processing application 104, executing the vendor application 117, and executing one or more web services that provide access to the online content 124 via the Internet.

The electronic data processing application 104 analyzes interactions with the online content 124 and determines, for each of multiple types of online content 124, a respective amount of engagement with the online content 124 having a given presentation type and a given subject matter type. The amounts of engagement are stored using the presentation type data 112 and the subject matter type data 114.

A presentation type indicates how certain items of online content 124 are presented via a client application 120. Examples of presentation types include textual content, video content, audio content, static image content, image slide shows, etc. For example, a first portion of the online content 124 may be a webpage having mostly text or all text (e.g., an online article or other webpage without multimedia graphics). A second portion of the online content 124 may be an online slideshow including multiple images. A third portion of the online content 124 may be an online video or audio presentation.

A subject matter type indicates the genre or other category of the subject matter of electronic content, regardless of whether the electronic content itself involves text, static images, videos, etc. Examples of media content types include fashion, sports, mobiles, automotive, education, food, health, real estate, etc. A given user or group of users may be more likely to engage with different presentation types depending on the types of media content included in the electronic content. For example, the same user may be more likely to access videos depicting sports content, image slideshows depicting fashion content, and text articles describing historical content.

The electronic data processing application 104 can identify different levels of engagement with different types of online content 124. A higher level of engagement with a text content may be indicated by a user clicking a link to the text content rather than clicking links to other types of content, clicking the link to the text content prior to clicking links to the other types of content, reading or otherwise accessing certain portions of the text content (e.g., by scrolling through text content, selecting text content, or otherwise interacting with or focusing on certain portions of the text content, etc.). A higher level of engagement with image content may be indicated by a user clicking the link to the image content rather than clicking links to other types of content, clicking the link to the image content prior to clicking links to the other types of content, viewing a threshold number of images from an image slideshow, zooming into one or more images, etc. A higher level of engagement with video content may be indicated by a user clicking a link to the video content rather than clicking links to other types of content, clicking the link to the video content prior to clicking links to the other types of content, viewing a threshold amount of the video (e.g., playing the video for a threshold duration of time), pausing the video, rewinding the video, zooming to different portions of the video, etc.

The electronic data processing application 104 creates, stores, updates, maintains, or otherwise uses client profiles 110 that identify levels of engagement based on both presentation type and subject matter type. For example, a client profile 110 may include presentation type data 112 that identifies presentation types such as text, audio, and video. The client profile 110 may also include subject matter type data 114 that identifies subject matter such as sports and fashion. The client profile 110 may also include engagement scores for different types of electronic content that involve different types of media content. For example, for sports-related content, a client profile 110 may indicate that text content has an engagement score of 70, that image content has an engagement score of 20, that video content has an engagement score of 10, and that audio content has an engagement score of 50. For fashion-related content, the client profile may indicate that text content has an engagement score of 10, that image content has an engagement score of 60, that video content has an engagement score of 60, and that audio content has an engagement score of 0.

The electronic data processing application 104 generates or modifies e-mails or other electronic communications 106 that are used to solicit interaction with online content 124. For example, the electronic data processing application 104 can be used in marketing campaigns. A marketer can use the electronic data processing application 104 to specify different types of online content 124 (e.g., text, images, videos, audio, etc.) associated with the campaign. The electronic data processing application 104 analyzes the specified online content 124 to identify one or more subject matter types for the only online content 124. For example, the electronic data processing application 104 may determine that online content 124 describing certain smart phones is associated with a "mobile device" subject matter type and that electronic content describing certain clothing or apparel is associated with a "fashion" subject matter type.

The electronic data processing application 104 generates e-mails or other electronic communications 106 in which links to different types of online electronic content (e.g., videos, text articles, image slide shows, etc.) are visually arranged according to a layout 108 based on different levels of engagement by users with different types of online content. For example, if the online content 124 includes sports content, the electronic data processing application 104 can determine the engagement by a given client (or set of clients) with online sports content and select or generate a layout 108 based on the determined level of engagement. In the layout 108, links to text articles may be displayed more prominently, and links to image slideshows may be displayed less prominently. The prominence of a link in a layout 108 can be increased by, for example, placing the link near the top of the layout, associating the link with a larger clickable region in the layout, etc. The electronic data processing application 104 can receive user inputs (e.g., from a marketer) that specify the particular links to be included in the electronic communication using the template.

Figures 2, 3:
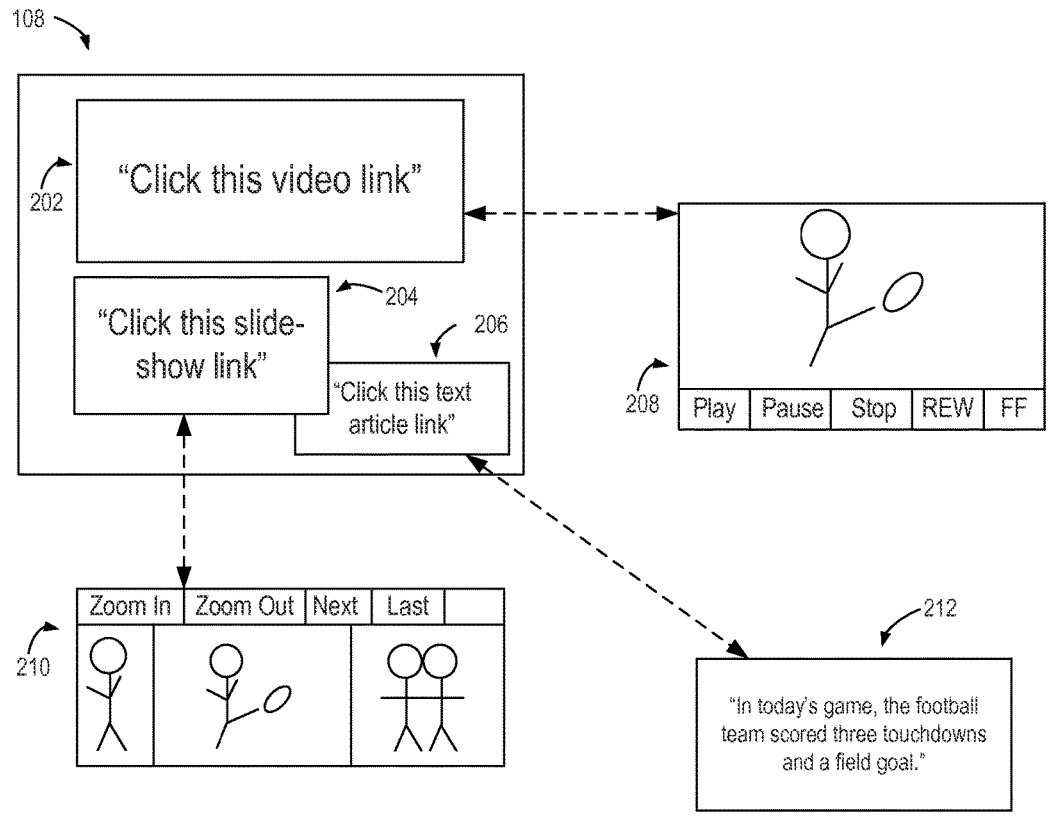
FIG. 2 is a diagram depicting an example of a layout for an electronic communication having interactive content used for accessing online content items with different presentation types according to certain exemplary embodiments.
FIG. 3 depicts an example of a client profile used by the electronic data processing application to select a layout for an electronic communication according to certain exemplary embodiments.

FIG. 2 is a diagram depicting an example of a layout 108 for an electronic communication 106 having interactive content used for accessing online content items with different presentation types. The layout 108 includes data that controls how interactive content items 202, 204, 206 within an electronic communication 106 are arranged when rendered for display at a client device 118.

The data controlling the arrangement of content items may indicate that certain portions of the layout 108 are to be used for interactive content items that are associated with online content having certain presentation types. For example, as depicted in FIG. 2, the content item 202 is positioned in a portion of the layout 108 that is used to access electronic content with a video presentation type. The interactive content item 204 is positioned in a portion of the layout 108 that is used to access electronic content with a slideshow presentation type. The interactive content item 206 is positioned in a portion of the layout 108 that is used to access electronic content with a text presentation type.

A given layout 108 can be used to display certain links or their associated content items in a relative order of prominence. The prominence of a given link can be indicated by a size of a content item associated with the link, a position of the content item within the layout 108, or a combination of the size and the position. For example, in FIG. 2, the content item 202 that is associated with a link to the online content item 208 has a size that is larger than either of the interactive content items 204, 206. The content item 202 is also positioned near the top edge of the layout 108. Thus, the content item 202 is more prominent than either of the interactive content items 204, 206.

In some embodiments, the layout 108 may use two-dimensional coordinates to specify a respective position of each of the interactive content items 202, 204, 206. In additional or alternative embodiments, the layout 108 may use three-dimensional coordinates to specify a respective position of each of the interactive content items 202, 204, 206 in a multi-layer layout 108. For example, for each of the interactive content items 202, 204, 206, the layout 108 may have an x coordinate indicating a horizontal position, a y coordinate indicating a vertical position, and a z coordinate indicating a layer in which the content item is positioned. As depicted in FIG. 2, the interactive content item 204 is positioned in a "top" or "front" layer such that the interactive content item 204 partially overlaps and obscures the interactive content item 206 within the layout 108. The position of the interactive content item 204 in a layer with higher visibility, along with the interactive content item 204 having a larger size than the interactive content item 206, indicates that the interactive content item 204 is more prominent than the interactive content item 206.

The electronic data processing application 104 can select the layout 108 for display in a graphical interface. The graphical interface be displayed at or otherwise provided to a vendor system 116 via the vendor application 117. The graphical interface can be used by a marketer or other user to identify specific links to online content items 208, 210, 212 that may be accessed by an electronic communication 106. Each of the interactive content items 202, 204, 206 is associated with a respective link to a respective webpage that includes a respective one of the online content items 208, 210, 212. For example, the content item 202 may include images, text, or other visible content that, when clicked, causes a client device 118 to access a web site hosted by the web server 122 and having the content item 208. (FIG. 2 includes dashed lines with bidirectional arrows to depict the associations between the interactive content items 202, 204, 206 and the respective online content items 208, 210, 212.)

The online content items 208, 210, 212 have different presentation types. For example, FIG. 2 depicts a content item 208 that is a video presentation displayed with a navigation interface (e.g., the buttons labeled "Play," "Pause," etc.). FIG. 2 also depicts a content item 210 that is a slideshow presentation of different images that are displayed with a navigation interface (e.g., the buttons labeled "Zoom In," "Zoom Out," etc.). FIG. 2 also depicts a content item 212 that is a text article.

The relative order of prominence in which links are displayed in a layout 108 can correspond to relative levels of engagement by a user with respect to different type of online content. For example, the prominence of the interactive content item 202 can reflect the higher likelihood of a user accessing an online video (e.g., item 208), the prominence of the interactive content item 204 can reflect the higher likelihood of the user accessing an online image slide-show (e.g., item 210), and the prominence of the interactive content item 206 can reflect the higher likelihood of the user accessing an online text article (e.g., item 212).

For illustrative purposes, interactive content items 202, 204, 206 are depicted as text (e.g., "Click this video link") corresponding to their associated presentation types. However, in some embodiments, the layout 108 includes messages or other indicators that prompt a user of a vendor system 116 to associate certain online content with certain presentation types with certain portions of the layout 108. For example, the layout 108 may include a message such as "Click this video link" to indicate that an online content item 208 with a video presentation type should be associated with the interactive content item 202, a message such as "Click this slideshow link" to indicate that an online content item 210 with an image presentation type should be associated with an interactive content item 204, and a message such as "Click this text article link" to indicate that an online content item 212 with textual presentation type should be associated with an interactive content item 206.

FIG. 3 depicts an example of a client profile 110 used by the electronic data processing application to select a layout 108 for an electronic communication 106. In some embodiments, each client profile 110 is associated with a given client. For example, the client profile may include an e-mail address, name, or other identifier of an individual to which electronic communications may be addressed. In additional or alternative embodiments, each client profile 110 is associated with a given group of clients. For example, multiple individuals or other entities may be grouped together for purposes of analysis. The analysis may be performed by the electronic data processing application 104 to select, modify, generate, or otherwise use a given layout 108 for electronic communications 106 that are generated and transmitted to the group of clients. The grouping of clients may be performed based on one or more suitable criteria (e.g., age, sex, geographic location, income level, etc.).

The client profile 110 depicted in FIG. 3 includes presentation type data 112 and subject matter type data 114 that indicate the extent to which one or more clients have interacted with certain types of electronic content presentations having certain types of subject matter. In the example depicted in FIG. 3, for each presentation type (e.g., text, images, video, and audio) and subject matter type (e.g., sports, fashion, etc.), a respective engagement score indicates a respective extent to which the client or group of clients has interacted with electronic content having the presentation type and subject matter type. For example, the engagement scores in the client profile 110 indicate that one or more clients have interacted more extensively with video content relating to sports, with both image content and video content related to fashion, etc. The engagement scores in the client profile 110 also indicate that one or more clients have interacted less extensively with text content relating to sports, with audio content related to fashion, etc. Thus, for the example depicted in FIG. 3, the engagement scores of 70, 20, and 10 indicating respective levels of interaction with sports videos, sports images, and sports text articles can be used to select the example layout 108 of FIG. 2 that displays a video link most prominently, an image link second-most prominently, and a text link third-most prominently.

Figure 4:
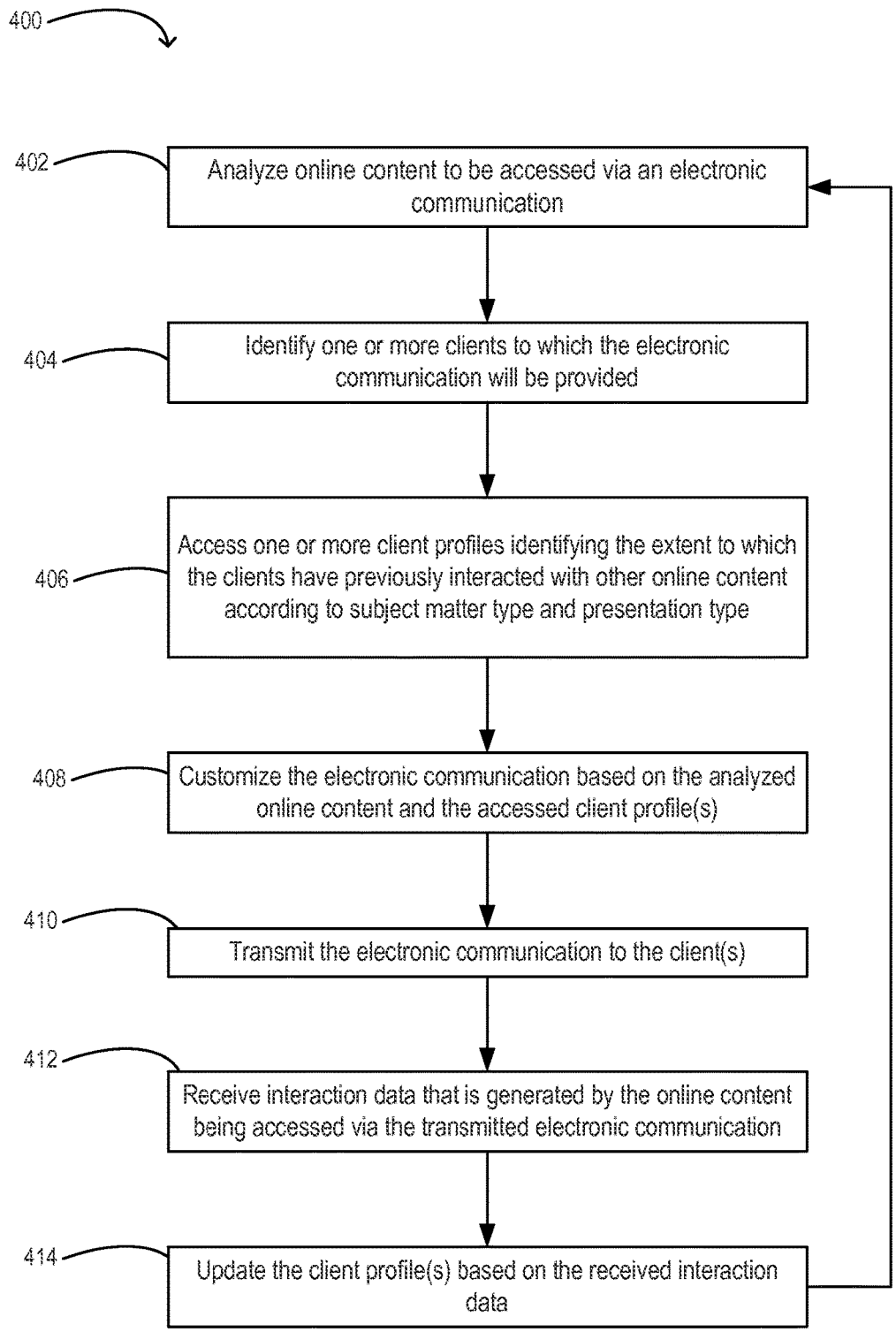
FIG. 4 is a flow chart depicting an example of a process for using presentation types and subject matter types to generate customized electronic communications for accessing online content according to certain exemplary embodiments.

FIG. 4 is a flow chart depicting an example of a process 400 for using presentation types and subject matter types to generate customized electronic communications for accessing online content. For illustrative purposes, the process 400 is described with reference to the implementation depicted in FIGS. 1-4. Other implementations, however, are possible.

The process 400 involves analyzing online content 124 to be accessed via an electronic communication, as depicted in block 402. For example, the electronic data processing application 104 can be executed by a suitable processing device to perform one or more operations suitable for implementing block 402. The operations may include performing one or more of text analysis algorithms, image analysis algorithms, transcription algorithms, and/or other suitable algorithms for identifying a given subject matter type for a given set of online content.

Figure 5:
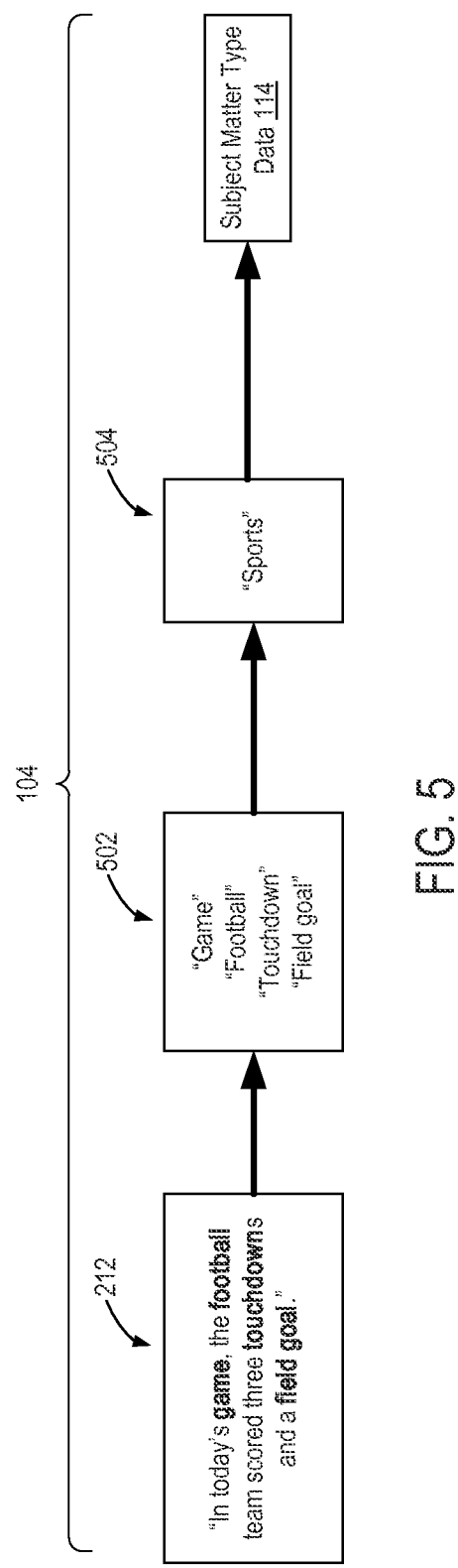
FIG. 5 is a diagram depicting an example of the electronic data processing application analyzing online content to determine a subject matter type according to certain exemplary embodiments.

For example, FIG. 5 is a diagram depicting an example of the electronic data processing application 104 analyzing online content to determine a subject matter type. In the depicted example, the electronic data processing application 104 executes a text analysis algorithm to analyze text from online content item 212 such as a sports new article. The text analysis algorithm identifies keywords 502 (e.g. "game," "football," etc.) from narrative content (e.g., paragraphs of text) in the online content item 212. The text analysis algorithm determines that one or more of the keywords are indicative of a given category 504 (e.g., "sports"). The electronic data processing application 104 updates the subject matter type data 114 to indicate that interactions with the online content item 212 are to be classified as interactions with online content 124 having a "sports" subject matter type.

To perform the analysis depicted in FIG. 5, the electronic data processing application 104 can access the online content 124 in any suitable manner. For example, a marketer may use the electronic data processing application 104 to build a marketing campaign. The marketer accesses the electronic data processing application 104, either directly or via a suitable vendor application 117. The marketer specifies the campaign material to be used in the campaign. For example, the electronic data processing application 104 receives user input from the marketer that includes one or more links to the online content 124 to be used in the campaign. The electronic data processing application 104 accesses the online content 124 via the data network 115 using the links. For example, the electronic data processing application 104 may access the web server 122 and download one or more copies of the online content 124. The electronic data processing application 104 analyzes and categories the downloaded version of the online content 124.

In some embodiments, the electronic data processing application 104 uses a text analysis algorithm or other suitable algorithm to categorize image content, video content, and/or audio content based on tags, captions, or other metadata that is included in or associated with the image content, video content, and/or audio content. For example, the electronic data processing application 104 may obtain keywords from the tags, captions, or other metadata and use the keywords to categorize the image content, video content, and/or audio content in a manner similar to that described above with respect to FIG. 5. The electronic data processing application 104 updates the subject matter type data 114 to indicate that interactions with the image content, video content, and/or audio content are to be classified as interactions with online content 124 having a subject matter type corresponding to the determined category. In some embodiments, the online content may not include tags or other metadata that is used to obtain these keywords. The electronic data processing application 104 can use an image analysis algorithm or other suitable algorithm to generate these tags or other metadata.

In additional or alternative embodiments, the electronic data processing application 104 uses a transcription algorithm or other suitable algorithm to categorize image content, video content, and/or audio content. For example, the electronic data processing application 104 may access audio data included in a set of online content 124 (e.g., a stand-alone audio file, audio data associated with a video or image, etc.). The electronic data processing application 104 generates a transcription of the audio data. The electronic data processing application 104 uses a text analysis algorithm to obtain keywords from the transcription and uses the obtained keywords to categorize the online content. The electronic data processing application 104 updates the subject matter type data 114 to indicate that interactions with the online content are to be classified as interactions with online content 124 having a subject matter type corresponding to the determined category.

The process 400 also involves identifying one or more clients to which the electronic communication 106 will be provided, as depicted in block 404. For example, the electronic data processing application 104 can be executed by a suitable processing device to perform one or more operations suitable for implementing block 404. The operations may include receiving one or more messages from a vendor application 117 identifying a client or a group of clients. The electronic data processing application 104 uses the messages to generate a list of clients to which the electronic communication will be provided.

The process 400 also involves accessing one or more client profiles 110 identifying the extent to which the clients have previously interacted with other online content according to subject matter type and presentation type, as depicted in block 406. For example, the electronic data processing application 104 can be executed by a suitable processing device to perform one or more operations suitable for implementing block 406. The operations include accessing a database or other suitable data structure that is stored in a non-transitory computer-readable medium and that includes one or more client profiles 110. The operations also include matching identifiers for one or more clients received from a vendor system 116 to one or more records for client profiles 110 that are stored in the database or other suitable data structure.

The process 400 also involves customizing the electronic communication 106 based on the analyzed online content 124 and one or more client profiles 110 accessed by the electronic data processing application 104, as depicted in block 408. For example, the electronic data processing application 104 can be executed by a suitable processing device to perform one or more operations suitable for implementing block 408. The operations may include accessing engagement scores associated with different presentation types for the subject matter type that is determined from the analysis of the online content 124. The operations include generating or selecting a layout 108 for the electronic communication 106 based on the engagement scores. The operations also include adding interactive content items to the electronic communication 106 in accordance with the layout 108. The electronic data processing application 104 can identify the interactive content items based on user inputs received from the vendor system 116. Additional details for generating a customized electronic communication 106 are provided below with respect to FIG. 6.

The process 400 also involves transmitting the electronic communication 106 to one or more identified clients, as depicted in block 410. For example, suitable program code can be executed by a suitable processing device to perform one or more operations suitable for implementing block 410. The operations may include accessing the electronic communication 106 from a computer-readable medium and transmitting signals representing the electronic communication 106 via one or more data networks 115. The signals are transmitted to one or more client devices 118. In some embodiments, the signals are transmitted to one or more client devices 118 directly. For example, signals representing the electronic communication 106 may be transmitted via one or more data networks 115 to a smart phone or other client device 118 without requiring a request by the client device 118. In additional or alternative embodiments, the signals are transmitted to one or more servers or other computing devices from which the client devices 118 can retrieve the electronic communication 106. For example, signals representing an e-mail may be transmitted via one or more data networks 115 to an e-mail server. A client application 120 executed on a client device 118 configures the client device 118 to access the e-mail server and download the e-mail.

In some embodiments, the electronic communication 106 is transmitted using a vendor application 117. The vendor application 117 receives the customized electronic communication 106 from the electronic data processing application 104 and configures a transmitting device of a vendor system 116 to transmit the electronic communication 106. In additional or alternative embodiments, the electronic communication 106 is transmitted using the electronic data processing application 104. The electronic data processing application 104 configures a transmitting device of the server system 102 to transmit the electronic communication 106 to one or more clients.

The process 400 also involves receiving interaction data that is generated as result of the online content 124 being accessed via the transmitted electronic communication 106, as depicted in block 412. The interaction data describes or otherwise indicates one or more attributes of interactions by clients with different sets of online content 124. For example, the interaction data may include records with one or more fields that describe an interaction. Examples of these fields include a timestamp of an interaction, a description of the interaction (e.g., a click, a selection of a navigation command for video or slideshow, a selection of text content, etc.), a location of the interaction within a webpage, an identifier of a particular content item (e.g., an address of webpage, an identifier of a video content or text content within the same webpage, etc.), or any other suitable data that describes or otherwise indicates how a client has interacted with a given content item.

The electronic data processing application 104 can be executed by a suitable processing device to perform one or more operations suitable for implementing block 412. In some embodiments, the electronic data processing application 104 receives, via one or more data networks 115, interaction data from a web server 122 or another server system that is independent from the server system 102. Examples of a server system that is independent from the server system 102 include a server controlled by an entity different from the entity that controls the server system 102, a server that is located on a different domain than the server system 102, etc. The independent server system stores the interaction data in response to a client device 118 using a client application 120 to interact with the online content 124. In additional or alternative embodiments, the electronic data processing application 104 generates the interaction data. The electronic data processing application 104 may be included in or in communication with a web service that provides access to the online content 124. The electronic data processing application 104 stores the interaction data in response to a client device 118 using a client application 120 to interact with the online content 124.

In some embodiments, the interaction data used by the electronic data processing application 104 includes data identifying associations between certain interactions with online content 124 and electronic communications 106 that are generated or modified using the electronic data processing application 104. For example, the interaction data may include one or more fields that identify a specific electronic communication 106 from which a given set of online content 124 is accessed. In additional or alternative embodiments, the electronic data processing application 104 may determine that certain interaction data generated during a time period is associated with electronic communications that are transmitted during a corresponding time period. For example, the electronic data processing application 104 may determine that a given electronic communication 106 was transmitted during a time period (e.g., on a certain date). The electronic data processing application 104 may receive or generate interaction data indicative of interactions that occurred subsequent to the time period (e.g., during a three-day window following the date on which the electronic communication 106 was transmitted). The electronic data processing application 104 associates the electronic communication 106 with the interaction data received or generated subsequent to the time period in which the electronic communication 106 was transmitted.

In some embodiments, the electronic data processing application 104 embeds or associates metadata with a given electronic communication 106 that is used to associate online content interactions with a corresponding subject matter type and presentation type. For example, for the electronic communication 106 depicted in FIG. 2, the electronic data processing application 104 can embed or associate metadata with the electronic content item 202 (or a region of the layout 108 that includes the electronic content item 202) indicating that online content 124 accessed via the electronic content item 202 has a presentation type "video" and a subject matter type "sports." The electronic data processing application 104 can also embed or associate metadata with the interactive content items 204, 206 (or regions of the layout 108 that respectively include the interactive content items 204, 206) indicating that online content 124 accessed via the respective electronic content item 204, 206 have respective presentation types "image" and "text" and have the subject matter type "sports."

Metadata included in electronic communications 106 can be used by the electronic data processing application 104 to update the client profile 110 with engagement scores or other data that is used to generate or modify subsequent electronic communications 106. For example, an electronic communication 106 such as an e-mail may include first metadata for a first clickable region used to access video content, second metadata for a second clickable region used to access image content, and third metadata for a third clickable region used to access text content. The electronic data processing application 104 or a suitable vendor application 117 transmits the e-mail to a client device 118. A user of the client device 118 uses a client application 120 (e.g., a web browser or e-mail application) to display the e-mail. The client application 120 receives a user input clicking the first clickable region (e.g., a link that is embedded in the e-mail and that is used to access video content). The client application 120 identifies an address that is included in the e-mail and that is associated with the first clickable region. The address identifies a web server 122 and associated online content 124 (e.g., a webpage). The client application 120 transmits a request to a web server 122 to access the webpage. The request includes an identifier included in the metadata of the e-mail. The identifier can be used to identify interactions with the webpage as interactions with video content related to sports. The web server 122 provides access to the webpage in response to the request. The web server 122 (or a web analytics server in communication with the web server) also includes the identifier from the request in interaction data that is generated by subsequent interactions with the webpage by the client application 120. Subsequently, when the electronic data processing application 104 obtains the interaction data, the electronic data processing application 104 uses the identifier to classify the interaction data as interactions with video content related to sports. Thus, the metadata included in the e-mail prior to its transmission can later be used by the electronic data processing application 104 to classify interactions with online content 124 that is accessed via the e-mail. The classified interactions can be used to select a layout 108 that displays links to different types of contents such that the likelihood of a user clicking on a link is increased.

The process 400 also involves updating one or more client profiles 110 based on the received interaction data, as depicted in block 414. For example, the electronic data processing application 104 can be executed by a suitable processing device to perform one or more operations suitable for implementing block 414. The operations include accessing a database or other suitable data structure that is stored in a non-transitory computer-readable medium and that includes one or more client profiles 110 to be updated. The operations also include modifying one or more records in the database or other suitable data structure in accordance with the received interaction data. For example, the electronic data processing application 104 can increase the engagement scores with respect to certain subject matter and presentation types based on the received interaction data.

The process 400 can return to block 402 and be performed using one or more updated client profiles 110 to generate additional electronic communications 106 using additional online content 124.

Figure 6:
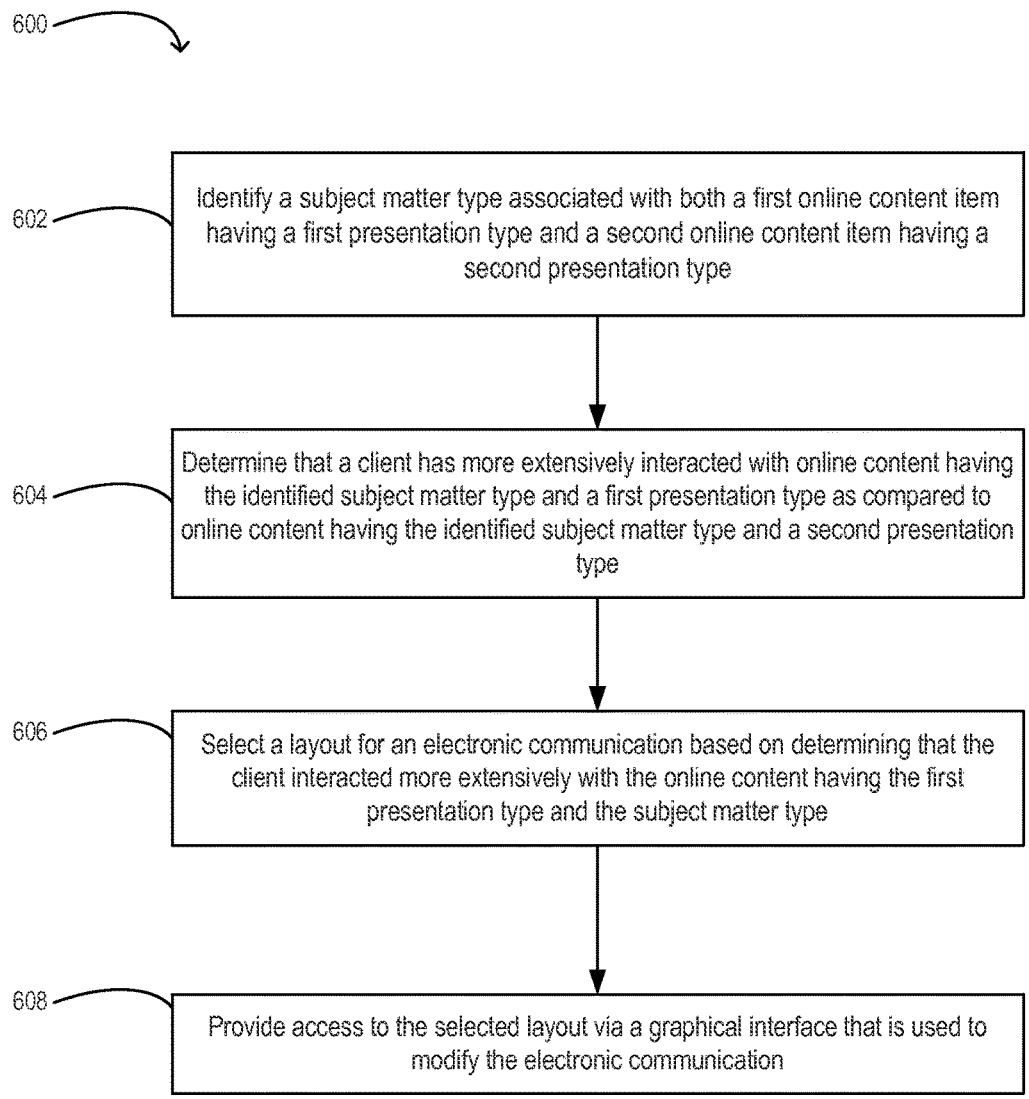
FIG. 6 is a flow chart depicting an example of a process for adaptively arranging interactive content in electronic communications used for accessing online content according to certain exemplary embodiments.

Any suitable process can be used to intelligently adapt how content in an electronic communication 106 is arranged for display. For example, FIG. 6 is a flow chart depicting an example of a process 600 for adaptively arranging interactive content in electronic communications used for accessing online content. The process 600 may be used to implement block 408 of the process 400. For illustrative purposes, the process 600 is described with reference to the implementation depicted in FIGS. 1-5. Other implementations, however, are possible.

The process 600 also involves identifying a subject matter type associated with both a first online content item having a first presentation type and a second online content item having a second presentation type, as depicted in block 602. For example, the electronic data processing application 104 can be executed by a suitable processing device to perform one or more operations suitable for implementing block 602. The operations may include performing an analysis of the additional online content, as described above with respect to block 402 of the process 400, or accessing the results of the analysis from a computer-readable medium.

The process 600 also involves determining that a client has more extensively interacted with online content having the identified subject matter type and a first presentation type as compared to online content having the identified subject matter type and a second presentation type, as depicted in block 604. The extent to which a client has interacted with online content may be determined using previous electronic communications for providing access to online content by one or more clients. In some embodiments, using these previous electronic communications to determine the extent to which one or more clients has interacted with online content involves determining the extent of interaction based on engagement scores in client profiles, where the engagement scores have been generated or modified based on interaction data received after the previous electronic communications were transmitted.

For example, the electronic data processing application 104 can be executed by a suitable processing device to generate or update one or more client profiles 110 using interaction data, as described above with respect to FIG. 4. The electronic data processing application 104 determines relative extents of interaction with online content having specific subject matter and presentation types by accessing one or more stored client profiles 110 from a database or other suitable data structure. The database or other suitable data structure can be stored on a non-transitory computer-readable medium that is included in or accessible to the server system 102. The electronic data processing application 104 accesses one or more engagement scores or other suitable data from the client profiles 110 that indicates levels of interaction for different types of online content with the subject matter type identified in block 602. The electronic data processing application 104 uses the accessed engagement scores or other data to determine, for the identified subject matter type, which presentation type is associated with the greatest extent of user interaction, which presentation type is associated with the second greatest extent of user interaction, etc.

In some embodiments, an extent to which a client interacted with an online content item is indicated by the client accessing the online content item prior to accessing one or more other online content items. For example, when updating a client profile 110, the electronic data processing application 104 may access time stamps associated with clicked links in an electronic communication 106 and/or time stamps associated with interactions with different items of the online content 124 that are accessible from the electronic communication 106. The electronic data processing application 104 uses the time stamps to determine the times at which different items of online content 124 were accessed. If a first online content item having a first presentation type is accessed prior to a second online content item having a second presentation type, the electronic data processing application 104 can increase an engagement score (or other indicator of user interaction) for the first online content item by a greater amount as compared to the second online content item. A higher engagement score for the first online content item is used at block 604 to determine a greater extent of interaction with the first online content item.

In additional or alternative embodiments, an extent to which a client interacted with an online content item is indicated by the client accessing the online content item without accessing one or more other online content items. For example, when updating a client profile 110, the electronic data processing application 104 may determine that a given electronic communication 106 included a link to a given type of online content 124, and that none of the corresponding interaction data indicates that the link was used to access the given type of online content 124. The absence of any interaction activity associated with the link can indicate a lesser degree of interaction with this type of online content 124.

In additional or alternative embodiments, an extent to which a client interacted with an online content item is indicated by the client accessing the online content item for a longer duration than one or more other online content items. For example, when updating a client profile 110, the electronic data processing application 104 may access time stamps for various interactions with various items of online content 124 accessible from the electronic communication 106. The electronic data processing application 104 uses the time stamps to determine durations with which different items of online content 124 were accessed. If a first online content item is associated with a greater duration of interaction than second online content item, an engagement score for a presentation type and subject matter type associated with the first online content item can be increased by a greater amount than an engagement score for a presentation type and subject matter type associated with the second online content item. A higher engagement score for the first online content item is used at block 604 to determine a greater extent of interaction with the first online content item.

In additional or alternative embodiments, an extent to which a client interacted with an online content item is indicated by a larger proportion of the online content item being presented to the client as compared to one or more other online content items. A larger proportion of the online content item being presented to the client can be reflected in a higher engagement score for the online content item. The higher engagement score is used at block 604 to determine a greater extent of interaction with the online content item. For example, a first online content item may be a text article having four pages, and a second online content item may be a slideshow having ten images. The electronic data processing application 104 may determine from interaction data that, on average, clients viewed three of the four pages (75%) of the text article and viewed six of the ten images (60%) of the slide show. Based on a greater percentage of the text article being viewed as compared to the slide show, an engagement score for a presentation type and subject matter type associated with the text article can be increased by a greater amount than an engagement score for a presentation type and subject matter type associated with the slide show. A higher engagement score for the text article may be used at block 604 to determine a greater extent of interaction with the text article.

In additional or alternative embodiments, an extent to which a client interacted with an online content item is indicated by the client navigating to different portions of the online content item more frequently as compared to other online content items. For example, different navigation interfaces may be used to navigate within different types of content. In one example, a navigation interface for video or audio content can include commands for rewinding, fast-forwarding, pausing, stopping, etc. In another example, a navigation interface for a slideshow or other image content can include commands for zooming, advancing to another image in a slideshow, moving to a previous image in a slideshow, etc. In another example, navigation interface for text content can include commands for performing a word search, navigating to a specific chapter or other section of a document, navigating to a specific page of the document, etc. In embodiments involving an engagement score for the client profile 110, the electronic data processing application 104 assigns different engagement score increments to different navigation events (e.g., an increment of five points for fast-forwarding a video, an increment of five points for fast-forwarding a video, an increment of ten points for zooming in on a particular image in a slideshow, an increment of five points for navigating to a particular chapter in a document, etc.). Interaction data for different online content 124 may include descriptions or other indicators of navigation events for different types of content. When updating a client profile 110, the electronic data processing application 104 can modify engagement scores for different presentation types and subject matter types based on the navigation events indicated by the interaction data and the increments used for different navigation events.

In some embodiments, the electronic communications are transmitted to multiple clients. Identifying a greater extent of interaction with the first online content item involves determining that a first subset of the clients (e.g., clients in a first demographic or location) interacted more extensively with the first online content item as compared to a second subset of clients (e.g., clients in a second demographic or location). If the electronic data processing application 104 determines that a given client is included in the first subset of clients, then the electronic data processing application 104 can proceed as if the client interacted more extensively with the first online content item than the second online content item, even if the electronic data processing application 104 lacks data about the client's specific interactions with the different items of online content. In one example, the electronic data processing application 104 may determine that the first subset of the clients that interacted with the first online content item is larger than a second subset of clients that interacted more extensively with the second online content item. In another example, the electronic data processing application 104 may determine that more interactions were performed by a first subset of clients than a second subset of clients.

The process 600 also involves selecting a layout for an electronic communication based on determining that the client interacted more extensively with the online content having the first presentation type and the subject matter type, as depicted in block 606. For example, the electronic data processing application 104 can be executed by a suitable processing device to perform one or more operations suitable for implementing block 606. The operations include generating a layout 108 or accessing a layout 108 from a computer-readable medium. The layout 108 includes multiple portions in which interactive content items for accessing different online content items may be positioned. A first portion for accessing the first online content item is displayed more prominently than a second portion for accessing the second online content item.

In some embodiments, the layout 108 may include associations between a given portion of the layout 108 and a link to electronic content having a specific subject matter and type. For example, the electronic data processing application 104 may perform an analysis, as described above with respect to block 402 of FIG. 4, of online content 124 that is to be used in one or more electronic communications 106 (e.g., content for a marketing campaign). After performing the analysis, the electronic data processing application 104 stores data that includes associations between each set of online content 124, a link to the set of online content 124, a subject matter type for the online content 124, and a presentation type for the online content 124. The electronic data processing application 104 can generate or update different layouts 108 to include different positions of links.

For example, a given marketing campaign may include, for each of two types of subject matter, a respective video content item, a respective text content item, and a respective image content item. The electronic data processing application 104 generates or modifies multiple layouts 108. In the multiple layouts, a first layout for the first subject matter type more prominently displays a clickable portion for accessing the corresponding video content item for the subject matter, and a second layout for the second subject matter type more prominently displays a clickable portion for accessing the corresponding text content item for the subject matter. Additionally or alternatively, the electronic data processing application 104 generates or modifies multiple layouts 108 such each type of subject matter is associated with at least three different layouts 108. One of the layouts 108 more prominently displays a clickable portion for accessing the corresponding video content item for the subject matter more prominently, another of the layouts 108 more prominently displays a clickable portion for accessing the corresponding text content item more prominently, and another of the layouts 108 more prominently displays a clickable portion for accessing the corresponding image content item more prominently. At block 606 of the process 600, the electronic data processing application 104 can select an appropriate layout 108 from the set of layouts based on the operations performed in blocks 602, 604.

In additional or alternative embodiments, a selected layout 108 may include prompts or suggestions for placing interactive content items. For example, a first portion at a more prominent position in the layout 108 may include prompts or suggestions to place interactive content items for a first presentation type, and a second portion at a less prominent position in the layout 108 may include additional prompts or suggestions to place interactive content items for a second presentation type. The layout 108 with a specific set of prompts or suggestions is selected based on (i) the subject matter type for the additional online content to be accessed using the new electronic communication 106 and (ii) the extent to which one or more relevant clients has previously interacted with online content having different presentation types.

The process 600 also involves providing access to the selected layout via a graphical interface that is used to modify the electronic communication, as depicted in block 608. For example, the electronic data processing application 104 can be executed by a suitable processing device to perform one or more operations suitable for implementing block 608. The operations include rendering a graphical interface that includes a preview of the electronic communication 106 with the selected layout 108 and causing a display device to display the graphical interface. In some embodiments, causing a display device to display the graphical interface involves configuring the display device of a server system 102 to display the graphical interface. In other embodiments, causing a display device to display the graphical interface involves transmitting data including the graphical interface from a server system 102 to a vendor system 116 having the display device that displays the graphical interface.

User inputs obtained via the graphical interface may be used by the electronic data processing application 104 to complete or modify the electronic communication 106. In one example, user inputs can specify interactive content items to be added to the electronic communication 106. For example, a given image or other interactive content item that indicates a video (e.g., a label stating "Would you like to watch a video?") can be selected by a user and added to a portion of the layout 108 that is associated with a link to video content. In another example, user inputs can specify links to online content to be added to the electronic communication 106. For example, if the layout 108 includes prompts (e.g. "place link to video content here," "place link to text content here," etc.) associated with a given portion of the layout, the graphical interface can be used to associate the portion of the layout with a specific link to online content corresponding to the prompt.

Figure 7:
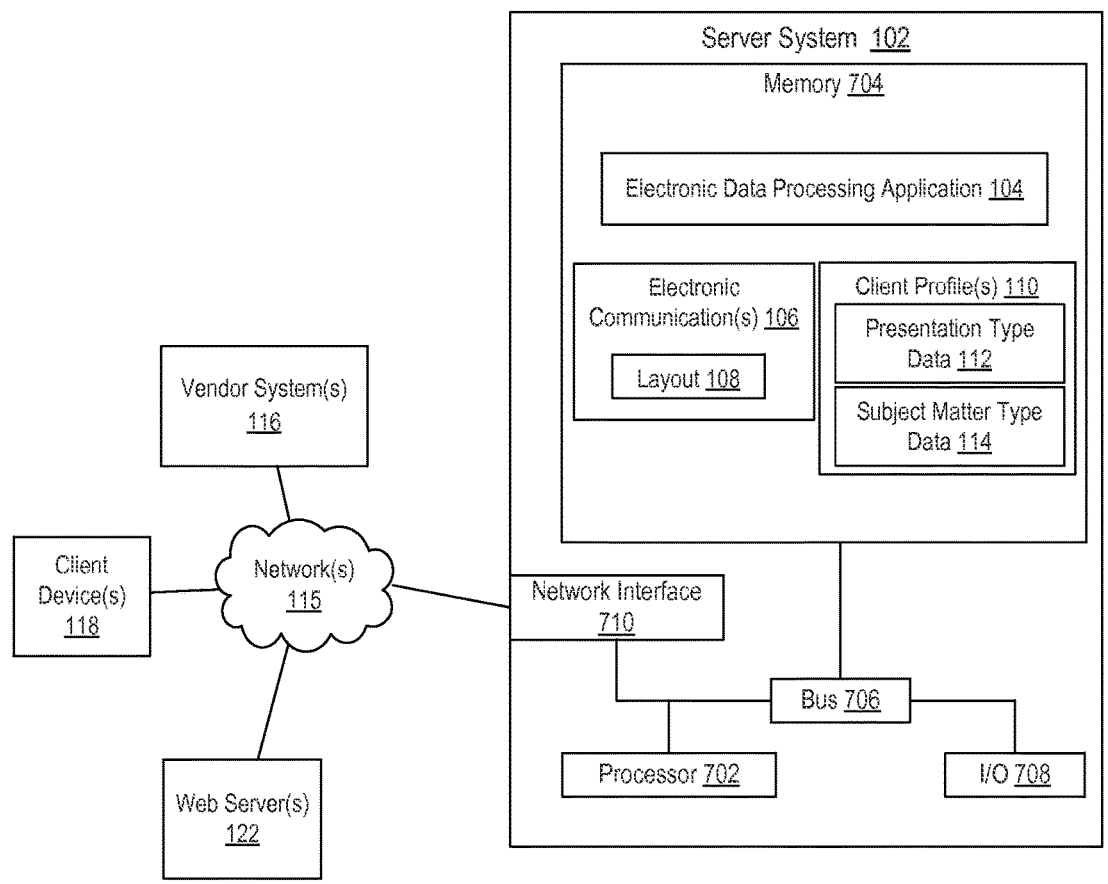
FIG. 7 is a block diagram depicting an example of a server system that executes the electronic data processing application for adaptively arranging content in electronic communications according to certain exemplary embodiments.

Any suitable computing system or group of computing systems can be used to implement the server system 102. For example, FIG. 7 is a block diagram depicting an example of a server system 102 that executes the electronic data processing application 104 for adaptively arranging content in electronic communications 106.

The server system 102 can include a processor 702 that is communicatively coupled to a memory 704 and that executes computer-executable program code and/or accesses information stored in the memory 704. The processor 702 may comprise a microprocessor, an application-specific integrated circuit ("ASIC"), a state machine, or other processing device. The processor 702 can include any of a number of processing devices, including one. Such a processor can include or may be in communication with a computer-readable medium storing instructions that, when executed by the processor 702, cause the processor to perform the operations described herein.

The memory 704 can include any suitable computer-readable medium. The computer-readable medium can include any electronic, optical, magnetic, or other storage device capable of providing a processor with computer-readable instructions or other program code. Non-limiting examples of a computer-readable medium include a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The server system 102 may also comprise a number of external or internal devices such as input or output devices. For example, the server system 102 is shown with an input/output ("I/O") interface 708 that can receive input from input devices or provide output to output devices. A bus 706 can also be included in the server system 102. The bus 706 can communicatively couple one or more components of the server system 102.

The server system 102 can execute program code that configures the processor 702 to perform one or more of the operations described above with respect to FIGS. 1-10. The program code can include, for example, the electronic data processing application 104. The program code may be resident in the memory 704 or any suitable computer-readable medium and may be executed by the processor 702 or any other suitable processor. In some embodiments, the electronic communications 106 and client profiles 110 can be resident in the memory 704, as depicted in FIG. 6. In other embodiments, one or more of the electronic communications 106 and client profiles 110 can be resident in a memory that is accessible via a data network, such as a memory accessible to a cloud service.

The server system 102 can also include at least one network interface 710. The network interface 710 can include any device or group of devices suitable for establishing a wired or wireless data connection to one or more data networks 115. Non-limiting examples of the network interface 710 include an Ethernet network adapter, a modem, and/or the like. The server system 102 can communicate with one or more vendor systems 116 and/or one of more client devices 118 using the network interface 710.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method for using a processing device to automatically arrange a display of electronic content, the method comprising:
   identifying a subject matter type associated with both a first online content item having a first presentation type and a second online content item having a second presentation type;
   determining that the client previously interacted more extensively with online content having the first presentation type and the subject matter type as compared to online content having the second presentation type and the subject matter type, wherein an extent to which the client interacted with the online content having the first and second presentation types is determined using electronic communications that were previously transmitted to a plurality of clients and that provided access to the online content associated with the subject matter type, wherein determining that the client interacted more extensively with the online content having the first presentation type comprises:
      identifying a first extent of interactions that are associated with a first subset of the plurality of clients that includes the client,
      identifying a second extent of interactions that are associated with a second subset of the plurality of clients that does not include the client, and
      determining that the first extent of interactions is greater than the second extent of interactions;
   selecting a layout for an electronic communication that provides access to the first online content item and the second online content item, wherein the layout is selected based on determining that the client interacted more extensively with the online content having the first presentation type, wherein the layout more prominently displays a first portion for accessing the first online content item having the first presentation type as compared to a second portion for accessing the second online content item having the second presentation type; and
   providing access to the electronic communication with the selected layout via a graphical interface.

2. The method of claim 1, wherein the first presentation type comprises at least one of textual content, video content, audio content, and image content;
   wherein the second presentation type comprises at least another of the textual content, the video content, the audio content, and the image content.

3. The method of claim 1, wherein determining that the client interacted more extensively with the online content having the first presentation type comprises at least one of:
   determining that the client accessed the online content having the first presentation type prior to accessing the online content having the second presentation type;
   determining that the client accessed the online content having the first presentation type without accessing the online content having the second presentation type ;
   determining that the client accessed the online content having the first presentation type for a longer duration than the online content having the second presentation type;
   determining that a larger proportion of the online content having the first presentation type was presented to the client as compared to the online content having the second presentation type; and
   determining that the client navigated to different portions of the online content having the second presentation type more frequently than the client navigated to different portions of the online content having the second presentation type.

4. The method of claim 1, wherein the layout displaying the first portion more prominently than the second portion comprises at least one of:
   including the first portion at a greater vertical position or a greater horizontal position in the layout than the second portion;
   including the first portion in a first layer having a greater visibility than a second layer in which the second portion is included; and
   using a larger size for the first portion than the second portion.

5. The method of claim 1, wherein the extent to which the client interacted with the online content having the first and second presentation types is also determined by accessing a client profile associated with the client, wherein the client profile comprises a plurality of engagement scores, wherein each of the plurality of engagement scores indicates a respective extent of interaction with respective online content having both a respective presentation type and a respective subject matter type, wherein the method further comprises:
- receiving, subsequent to a transmission of the electronic communication, interaction data indicative of interactions with the first online content item and the second online content item;
- updating the client profile based on the received interaction data, wherein the updated client profile indicates that the client has interacted more extensively with online content with the subject matter type and the second presentation type as compared to online content with the subject matter type and the first presentation type;
- selecting, for an additional electronic communication, an additional layout based on the updated client profile indicating more extensive interaction with the second presentation type for the subject matter type, wherein the additional electronic communication provides access to a third online content item having the subject matter type and the first presentation type and also provides access to a fourth online content item having the subject matter type and the second presentation type, wherein the additional layout displays a portion for accessing the fourth online content item more prominently than a portion for accessing the third online content item.

6. The method of claim 1, further comprising:
- identifying an additional subject matter type associated with a third online content item having the first presentation type and a fourth online content item having the second presentation type;
- determining, using the electronic communications previously transmitted to the client, that the client interacted more extensively with online content having the additional subject matter type and the second presentation type as compared to a previous online content item having the additional subject matter type and the first presentation type;
- based on determining that the client interacted more extensively with the online content item the additional subject matter type and the second presentation type, selecting an additional layout for an additional electronic communication that provides access to the third online content item and the fourth online content item, wherein the additional layout displays a portion for accessing the fourth online content item more prominently than a portion for accessing the third online content item; and
- providing access to the additional layout via the graphical interface.

7. A system comprising:
a processor; and
a non-transitory computer-readable medium communicatively coupled to the processor, wherein the processor is configured for executing program code stored in the non-transitory computer-readable medium and thereby performing operations comprising:
- identifying a subject matter type associated with both a first online content item having a first presentation type and a second online content item having a second presentation type,
- determining that the client previously interacted more extensively with online content having the first presentation type and the subject matter type as compared to online content having the second presentation type and the subject matter type, wherein an extent to which the client interacted with the online content having the first and second presentation types is determined by accessing a client profile associated with the client, wherein the client profile comprises a plurality of engagement scores, wherein each of the plurality of engagement scores indicates a respective extent of interaction with respective online content having both a respective presentation type and a respective subject matter type,
- selecting a first layout for a first electronic communication that provides access to the first online content item and the second online content item, wherein the first layout is selected based on determining that the client interacted more extensively with the online content having the first presentation type, wherein the first layout more prominently displays a first portion for accessing the first online content item having the first presentation type as compared to a second portion for accessing the second online content item having the second presentation type,
- providing access to the first electronic communication with the selected first layout via a graphical interface,
- receiving, subsequent to a transmission of the first electronic communication, interaction data indicative of interactions with the first online content item and the second online content item,
- updating the client profile based on the received interaction data, wherein the updated client profile indicates that the client has interacted more extensively with online content with the subject matter type and the second presentation type as compared to online content with the subject matter type and the first presentation type, and
- selecting, for a second electronic communication, a second layout based on the updated client profile indicating more extensive interaction with the second presentation type for the subject matter type, wherein the second electronic communication provides (i) access to a third online content item having the subject matter type and the first presentation type and (ii) access to a fourth online content item having the subject matter type and the second presentation type,
- wherein the second layout displays a portion for accessing the fourth online content item more prominently than a portion for accessing the third online content item.

8. The system of claim 7, wherein the first presentation type comprises at least one of textual content, video content, audio content, and image content;
wherein the second presentation type comprises at least another of the textual content, the video content, the audio content, and the image content.

9. The system of claim 7, wherein determining that the client interacted more extensively with the online content having the first presentation type comprises at least one of:
- determining that the client accessed the online content having the first presentation type prior to accessing the online content having the second presentation type;
- determining that the client accessed the online content having the first presentation type without accessing the online content having the second presentation type ;
- determining that the client accessed the online content having the first presentation type for a longer duration than the online content having the second presentation type;

determining that a larger proportion of the online content having the first presentation type was presented to the client as compared to the online content having the second presentation type; and determining that the client navigated to different portions of the online content having the second presentation type more frequently than the client navigated to different portions of the online content having the second presentation type.

10. The system of claim 7, wherein the first layout displaying the first portion more prominently than the second portion comprises at least one of:

including the first portion at a greater vertical position or a greater horizontal position in the first layout than the second portion;

including the first portion in a first layer having a greater visibility than a second layer in which the second portion is included; and using a larger size for the first portion than the second portion.

11. The system of claim 7, wherein the processor is also configured for determining the extent to which the client interacted with the online content having the first and second presentation types by using electronic communications that were previously transmitted to a plurality of clients and that provided access to the online content associated with the subject matter type, wherein determining that the client interacted more extensively with the online content having the first presentation type comprises:

identifying a first extent of interactions that are associated with a first subset of the plurality of clients that includes the client;

identifying a second extent of interactions that are associated with a second subset of the plurality of clients that does not include the client; and determining that the first extent of interactions is greater than the second extent of interactions.

12. The system of claim 7, the operations further comprising:

identifying an additional subject matter type associated with a fifth online content item having the first presentation type and a sixth online content item having the second presentation type;

determining, using the electronic communications previously transmitted to the client, that the client interacted more extensively with online content having the additional subject matter type and the second presentation type as compared to a previous online content item having the additional subject matter type and the first presentation type;

based on determining that the client interacted more extensively with the online content item the additional subject matter type and the second presentation type, selecting an additional layout for an additional electronic communication that provides access to the fifth online content item and the sixth online content item, wherein the additional layout displays a portion for accessing the sixth online content item more prominently than a portion for accessing the fifth online content item; and providing access to the additional layout via the graphical interface.

13. A non-transitory computer-readable medium having program code that is executable by a processor stored thereon, the program code comprising:

program code for identifying a first subject matter type associated with both a first online content item having a first presentation type and a second online content item having a second presentation type;

program code for determining that the client previously interacted more extensively with online content having the first presentation type and the first subject matter type as compared to online content having the second presentation type and the first subject matter type;

program code for selecting a first layout for a first electronic communication that provides access to the first online content item and the second online content item, wherein the first layout is selected based on determining that the client interacted more extensively with the online content having the first presentation type, wherein the first layout more prominently displays a first portion for accessing the first online content item having the first presentation type as compared to a second portion for accessing the second online content item having the second presentation type;

program code for providing access to the first electronic communication with the selected first layout via a graphical interface;

program code for identifying a second subject matter type associated with a third online content item having the first presentation type and a fourth online content item having the second presentation type;

program code for determining, using the electronic communications previously transmitted to the client, that the client interacted more extensively with online content having the second subject matter type and the second presentation type as compared to a previous online content item having the second subject matter type and the first presentation type;

program code for selecting, based on determining that the client interacted more extensively with the online content item having the second subject matter type and the second presentation type, a second layout for a second electronic communication that provides access to the third online content item and the fourth online content item, wherein the second layout displays a portion for accessing the fourth online content item more prominently than a portion for accessing the third online content item; and program code for providing access to the second layout via the graphical interface.

14. The non-transitory computer-readable medium of claim 13, wherein the first presentation type comprises at least one of textual content, video content, audio content, and image content;

wherein the second presentation type comprises at least another of the textual content, the video content, the audio content, and the image content wherein determining that the client interacted more extensively with the online content having the first presentation type comprises at least one of:

determining that the client accessed the online content having the first presentation type prior to accessing the online content having the second presentation type;

determining that the client accessed the online content having the first presentation type without accessing the online content having the second presentation type ;

determining that the client accessed the online content having the first presentation type for a longer duration than the online content having the second presentation type;

determining that a larger proportion of the online content having the first presentation type was presented to the client as compared to the online content having the second presentation type; and determining that the client navigated to different portions of the online content having the second presentation type more frequently than the client navigated to different portions of the online content having the second presentation type.

15. The non-transitory computer-readable medium of claim 13, wherein the first layout displaying the first portion more prominently than the second portion comprises at least one of:

including the first portion at a greater vertical position or a greater horizontal position in the first layout than the second portion;

including the first portion in a first layer having a greater visibility than a second layer in which the second portion is included; and using a larger size for the first portion than the second portion.

16. The non-transitory computer-readable medium of claim 13, wherein program code for determining an extent to which the client interacted with the online content having the first and second presentation types comprises program code for using electronic communications that were previously transmitted to a plurality of clients and that provided access to the online content associated with the first subject matter type, wherein determining that the client interacted more extensively with the online content having the first presentation type comprises:

identifying a first extent of interactions that are associated with a first subset of the plurality of clients that includes the client;

identifying a second extent of interactions that are associated with a second subset of the plurality of clients that does not include the client; and determining that the first extent of interactions is greater than the second extent of interactions.

17. The non-transitory computer-readable medium of claim 13, wherein program code for determining an extent to which the client interacted with the online content having the first and second presentation types comprises program code for accessing a client profile associated with the client, wherein the client profile comprises a plurality of engagement scores, wherein each of the plurality of engagement scores indicates a respective extent of interaction with respective online content having both a respective presentation type and a respective subject matter type, wherein the program code further comprises:

program code for receiving, subsequent to a transmission of the first electronic communication, interaction data indicative of interactions with the first online content item and the second online content item;

program code for updating the client profile based on the received interaction data, wherein the updated client profile indicates that the client has interacted more extensively with online content with the first subject matter type and the second presentation type as compared to online content with the first subject matter type and the first presentation type;

program code for selecting, for an additional electronic communication, an additional layout based on the updated client profile indicating more extensive interaction with the second presentation type for the first subject matter type, wherein the additional electronic communication provides access to a fifth online content item having the first subject matter type and the first presentation type and also provides access to a sixth online content item having the first subject matter type and the second presentation type, wherein the additional layout displays a portion for accessing the sixth online content item more prominently than a portion for accessing the fifth online content item.

* * * * *